Figure 1:
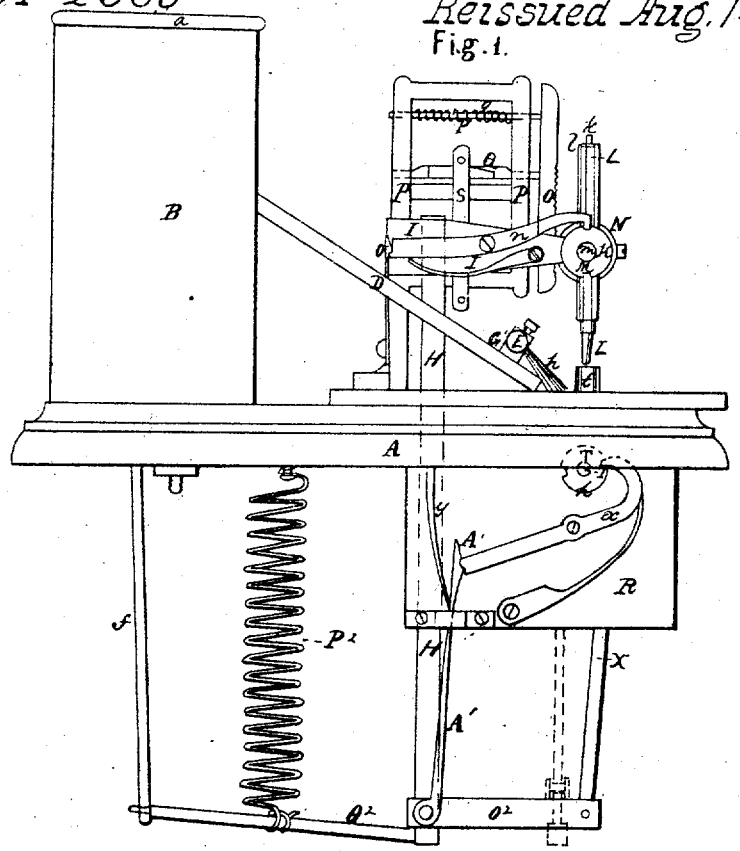

J. Keith.

Eyeleting Machine.

No. 2335

Reissued Aug. 14, 1866.

Witnesses

F. P. Hale Jr

J. R. Bampton

Inventor

Jeremiah Keith

J. Keith.
Eyeleting Machine.

No 2335 Reissued Aug. 14, 1866.

Witnesses.

T. P. Hale Jr.
J. R. Bampton

Inventor

Jeremiah Keith

J. Keith.
Eyeleting Machine.
No 2335 Reissued Aug. 14, 1866.
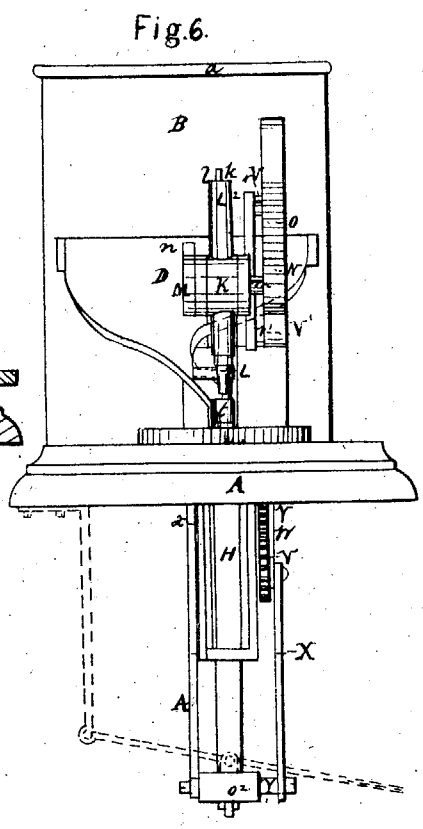
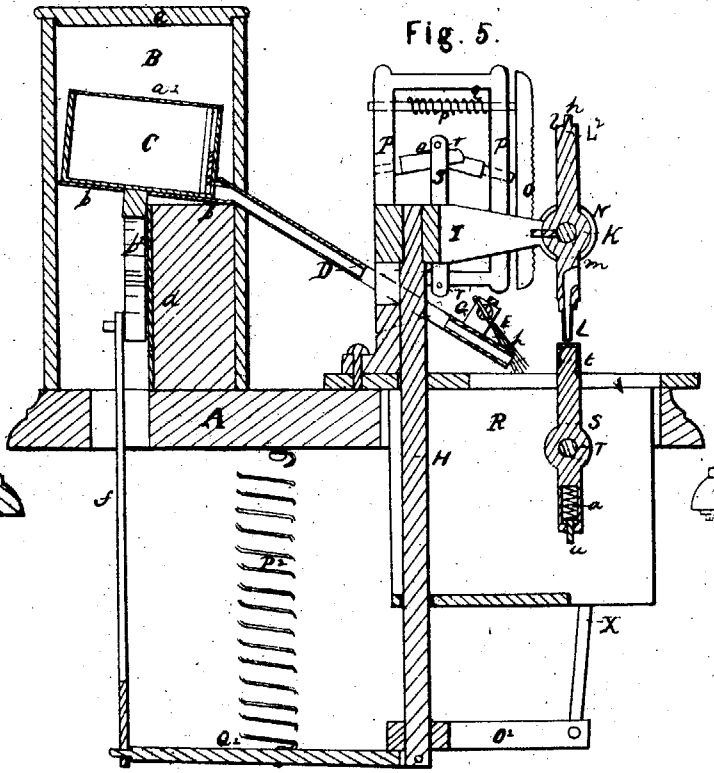
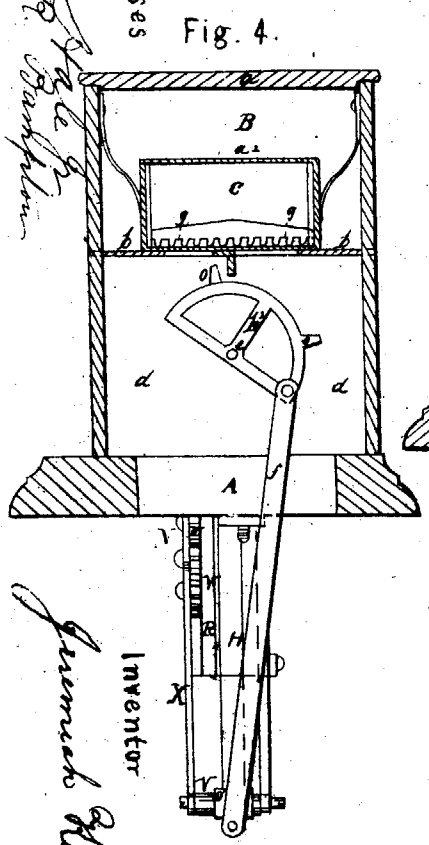
Witnesses
F. P. Hale Jr.
J. R. Bamfylow
Inventor
Jeremiah Keith

UNITED STATES PATENT OFFICE.

ELMER TOWNSEND, OF BOSTON, MASSACHUSETTS, ASSIGNEE, BY MESNE ASSIGNMENTS, OF JEREMIAH KEITH.

IMPROVEMENT IN MACHINES FOR PUNCHING AND EYELETING SHOES, &c.

Specification forming part of Letters Patent No. 37,170, dated December 16, 1862; Reissue No. 2,335, dated August 14, 1866.

*To all whom it may concern:*

Be it known that JEREMIAH KEITH, of New Bedford, in the county of Bristol and State of Massachusetts, invented an Improved Eyeleting and Punching Machine; and I, ELMER TOWNSEND, of Boston, as aforesaid, (assignee,) do hereby declare that the following, taken in connection with the drawings which accompany and form part of this specification, is a description of his invention sufficient to enable those skilled in the art to practice it.

The primary object of this invention is to obtain a machine for setting or clinching eyelets in stock, (such, for instance, as boots and shoes,) in which the eyelets taken from a promiscuous collection may be successively and automatically presented to the action of the clinching-tools. Prior to this invention there had been, so far as is known to the inventor, no mechanism which effected this result, though a machine had been devised in which the eyelets were arranged or threaded in regular order upon a stem or wire and removed therefrom to the clinching-tools. It will be obvious, however, that such arrangement is objectionable because of the labor incident to threading the eyelets, which is nearly as great as that employed to introduce them singly by hand to the action of such clinching-tools. For this and other reasons such construction has had but a very limited use.

In the machine herein to be described the eyelets are thrown together into a box or magazine without regard to their positions, and from this magazine they emerge in upright positions through an opening or openings constructed to allow them to pass when, and only when, in proper positions; and this feature constitutes one portion of the invention.

In order to have a succession of eyelets properly and constantly presented for the successive actions of the setting-tools, and to remove the setting-tools from too close proximity to the eyelet-magazine to allow the convenient introduction of the stock to be eyeleted, it was found desirable to employ an inclined conductor or chute leading from the magazine to a point near to, and in, or about in a horizontal plane with the sets; and such a device is employed in this invention, it being so arranged to operate, in combination with the magazine, that it is kept charged with eyelets, which slide down through it, the lowermost one being always in position to be taken by the clinching-tools. This constitutes another portion of the invention.

To facilitate the entrance of the eyelets into the gates or openings and thence to the chute or conductor, a vibratory or shaking movement is given, agitating the body of eyelets until in their movements they assume upright positions and come opposite to the gates, when they will slip through and slide down the chute. This feature constitutes another portion of the invention.

With the setting or clinching-tools there is combined a bed and punch for punching the holes for reception of the eyelets, this bed and punch being so arranged and operated that they are automatically brought into position after each action of the setting-tools; and this construction or combination also forms part of the invention.

To keep the lowermost eyelet in the chute in position until seized by the pin of one of the setting-tools, a detainer or detaining-surface is employed, which detains the eyelet at the bottom of the chute, but yields to allow its exit when the said pin enters it; and such device forms another part of the invention.

In connection with the chute or magazine and clinching mechanism, it is desirable to employ a yielding pin upon the setting-tool, which takes the eyelet from the chute, said pin holding the eyelet in position until the upsetting-tool comes down upon it, and yielding to the pressure of said upper setting-tool; and this combination is also of my invention.

Figure 7:
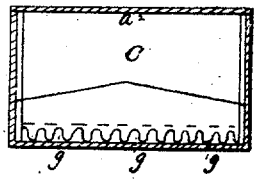
Figure 3:
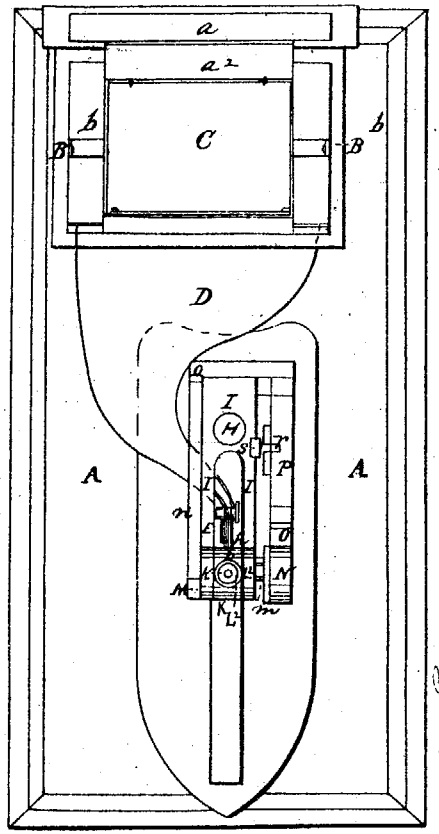
Figure 2:
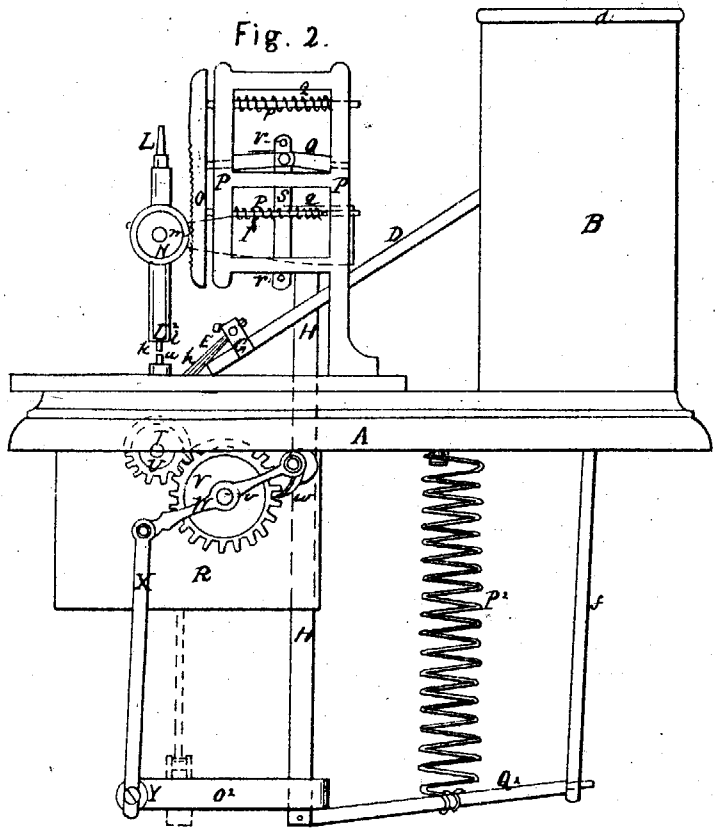

The drawings represent a machine embodying the invention,

Figures 1 and 2 showing side elevations of the same; Fig. 3, a top view with the covers of the magazine and magazine-box thrown back. Fig. 4 is a vertical transverse section taken through the eyelet-magazine. Fig. 5 is a vertical and longitudinal section taken through the punching and setting tools. Fig. 6 is a front elevation of the machine; Fig. 7, a section of the eyelet-magazine, showing the exit-gates in elevation.

A denotes a bed or table; B a frame erected thereupon for supporting a magazine or box, C, for containing the eyelets, which are thrown loosely into it without regard to position. The magazine is inclined, as seen in Fig. 5, so as to throw the body of eyelets toward the front side of the box, and at this side it is provided with one or more gates or passages, *g*, of such size and form as to allow the eyelets to slip through the box when, and only when, they are in upright position.

From this magazine, if the mechanism be not so arranged as that the eyelets shall pass from the magazine directly upon the pin of one of the setting-tools, an inclined hopper, D, leads, the gates *g* opening from the magazine into the chute, and the chute extending down to a point where the setting-tools may take the lowermost eyelet properly presented at the end of the chute. This chute is so constructed that the eyelets are kept in line and in upright position, while they slide freely by the action of gravity from the magazine to the lower end of the chute.

To agitate the body of eyelets in the magazine so as to cause them to constantly change position until, in assuming upright positions, they slip through the gates *g*, the magazine has a vibrating or reciprocating shaking movement given to it, the mechanism shown for imparting said movement being as follows: The magazine is supported on a platform, *b*, which may be so arranged as to be capable of a tilting or rocking movement, and this platform has an opening in it, through which a stud projects, as seen in Figs. 4 and 5. Below the platform is a dog-plate, $b^2$, rocking on a pivot, *e*, and having on its periphery one or more dogs or teeth, *o*. This plate is jointed by a connecting-rod, *f*, to a treadle or other lever, through which the setting and punching tools are operated, the plate $b^2$ thereby receiving a rocking movement, and one of the teeth *o* striking the stud projecting from the magazine at each movement of the rod, thus giving a reciprocating lateral movement to the magazine and agitating the eyelets, as will be readily understood.

The setting or clinching tools are seen at S and K. The lower one, S, is shown as havin a spring-pin, *u*, to remove the lowermost eyelet from the chute upon one end, and a punch-bed, *t*, on the other end, the piece S rotating one hundred and eighty degrees at proper times to bring either end up. The upper tool or piece, K, has on one end a punch, L, co-operating with the bed *t*, and on the other an upsetter, *l*, which clinches the eyelet against the anvil end of the piece S, carrying the spring-pin *u*, said spring-pin yielding as the upsetter comes down upon it, and thus allowing the eyelet to be clinched in the stock. The pieces S and K both rotate vertically in the vertical plane with the center of the chute, and the construction and arrangement of the lower piece with relation to the chute is such that as the pin *u* in its rotation approaches the chute it enters the lower eyelet, removing it from the chute and carrying it directly under the upsetting-face *l*, which has been simultaneously rotated to bring it into position to be forced down upon the eyelet.

The upper tool, K, is fixed on a shaft, *n*, which turns in the bearings in the end of a forked bar, I, mounted on the top of a vertical slide-rods H, jointed to a bar, $Q^2$, by depression and elevation of which the mechanism is operated.

One end of the shaft carries a friction-wheel, N, which at proper times is impinged upon by a presser-bar, O, sliding out from a stationary frame, P, to which it is connected by slide-rods *p*. In the frame P is a toggle-joint, Q, the arms of which extend across the frame, one of them projecting through and abutting against or being connected to the presser-bar O, as seen in Figs. 2 and 5. This toggle is actuated by a vertical bar, S, which bears two studs or projections, *r r'*, said bar being affixed to the bar I. When the rod H is depressed the upper stud, *r*, strikes the top of the toggle and straightens its arms, forcing the bar O outward, and carrying the friction-surface of said bar against the surface of the friction-wheel N, this bar O being roughened on its surface, or provided with rubber or similar material, to produce rotation of the friction-wheel as the bar H rises. When this contact is produced the ascent of the bar I causes the wheel N to rotate one hundred and eighty degrees, reversing the position of the punch L and upsetter *l*, the lower stud, after such reversal, striking the toggle and throwing its arms out of line and the presser-bar out of contact with the wheel, where it remains until the two setting or punching tools have next operated together, the upper stud effecting the contact again and again, causing the reversal of the tools as the bar H next ascends.

To determine the position of the punch or upsetting-tool, or to stop its further rotation when it has come into a vertical position, one end of the shaft *m* carries a wheel, M, having two opposite notches, into which the tooth of a spring-pawl, *n*, slips when either end of the tooth K comes into vertical position. This pawl is tripped by a catch, *o*, fixed to the table A, as the bar I descends, permitting the wheel N to be rotated until the spring on the pawl carries the pawl-tooth into the opposite notch in the wheel M. Similar semi-rotation is imparted to the under tool, S, to bring its co-operative end into position for the action of the punch or upsetter, as follows: The tool S is mounted on a shaft, T, turning in bearings in the stationary frame R. One end of this shaft carries a gear, U, into which a pinion, V, meshes, which pinion is driven by a pawl, *w*, on a lever, W, jointed by a connecting-rod, X, to a bar, $Q^2$, which is fixed to and moves with the bar $Q^2$, which actuates the slide-rod H, being forced down by a treadle-lever or otherwise, and carried upward by a spring, $P^2$. The opposite end of the shaft T carries a notched wheel, Z, into the notches of which a tooth on a pawl, *x*, engages. To disengage the pawl from the wheel Z, to allow said wheel to be turned one hundred and eighty degrees, the bar $Q^2$ carries a tripper, A′, which, striking the adjacent end of the pawl-lever as the rod H ascends, releases the wheel from the pawl and allows the pawl *w*, operating on the pinion V, to turn the wheel U a semi-rotation, when the pawl *x* will slip into the opposite notch and hold the tooth S in vertical position.

The two co-operating ends of the tools K and S, on each ascent of the rod H being thus brought into position, the descent of the rod brings these ends together and effects either the punching of the stock or the setting of the eyelet, accordingly as the punching or setting tools are alternately and successively brought into position.

The lower end of the eyelet-chute is provided with a yielding detainer, E, consisting of a flexible spring or springs, or other equivalent material, so attached to the chute as to extend into the path of the eyelets to stop the lowermost eyelet in position for the pin *u* in its rotative movement to enter said eyelet and carry it into position to be clinched, as before explained, the detainer yielding to allow the passage of the eyelet, and springing back to stop the next descending eyelet in the chute.

From this description the operation of the machine in punching the stock, in automatically bringing the eyelets into position, and in clinching them, will be readily understood without further elucidation.

It will be obvious that an inclined eyelet-magazine may be employed, in combination with the setting-tools, without the inclined chute, the spring-pin on the anvil-set taking the eyelet directly from a gage opening or openings in the magazine, instead of from the end of the chute; but such an arrangement, though practicable, is not deemed so practical as an organization having the chute interposed between the magazine and setting-tools, such organization insuring a succession or column of properly-disposed eyelets, which slide down the chute and come into position by the action of gravity.

It will also be obvious that the employment of the punching-tools may be dispensed with and only the setting-tools used, in which case the upper tool will need to have only the vertical motion to clinch the eyelet, and the lower tool only a lateral or rotary motion sufficient to take the eyelet from the chute for from the magazine and bring it into position for the action of the upsetting-tool.

What is claimed is—

1. The combination, with eyelet setting or clinching tools, of a magazine in which the eyelets are loosely contained, but from which they emerge in upright position for the action of the setting-tools.

2. The combination, with an eyelet-magazine and eyelet-clinching tools, of an interposed chute or conductor into which the upright eyelets emerge from the magazine, and by which each in succession is conveyed to position to be seized by the pin of one of the setting-tools.

3. A construction by which the eyelets in the magazine are agitated to cause them to assume positions in which they may emerge from the magazine.

4. So constructing the lower end of the chute that each lowermost eyelet is detained in position until removed by the eyelet-pin.

5. Combining with an automatic eyelet presenting and setting mechanism an automatic punching mechanism operating in the same vertical line of operation with the clinching mechanism.

6. Combining with the mechanism which brings each eyelet into position before the clinching mechanism a yielding pin projecting from the anvil-set, said pin receiving the eyelet and holding it in position for the descent of the upsetting-tool and yielding to the pressure of said upsetting-tool or the pin projecting therefrom.

In witness whereof I have hereunto set my hand this 5th day of February, A. D. 1866.

ELMER TOWNSEND.

Witnesses:

J. B. CROSBY,

F. GOULD.